Nov. 9, 1954　　　　F. T. HARRINGTON ET AL　　　　2,693,824
POWER TRANSMISSION VALVE
Filed June 15, 1950　　　　　　　　　　　　　　　　5 Sheets-Sheet 2
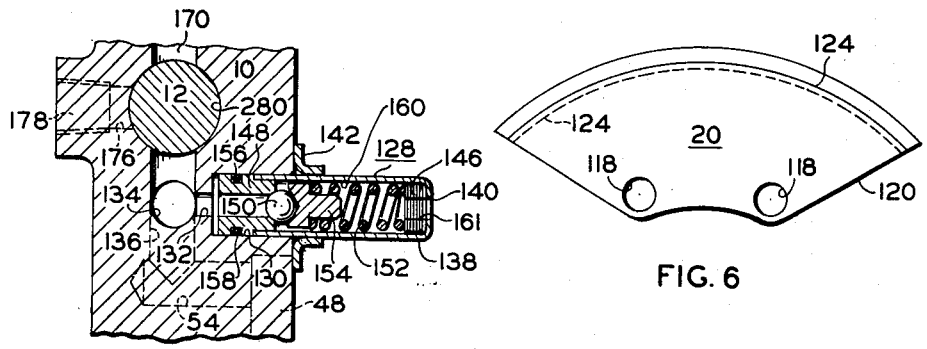
FIG. 5　　　　　　　FIG. 6
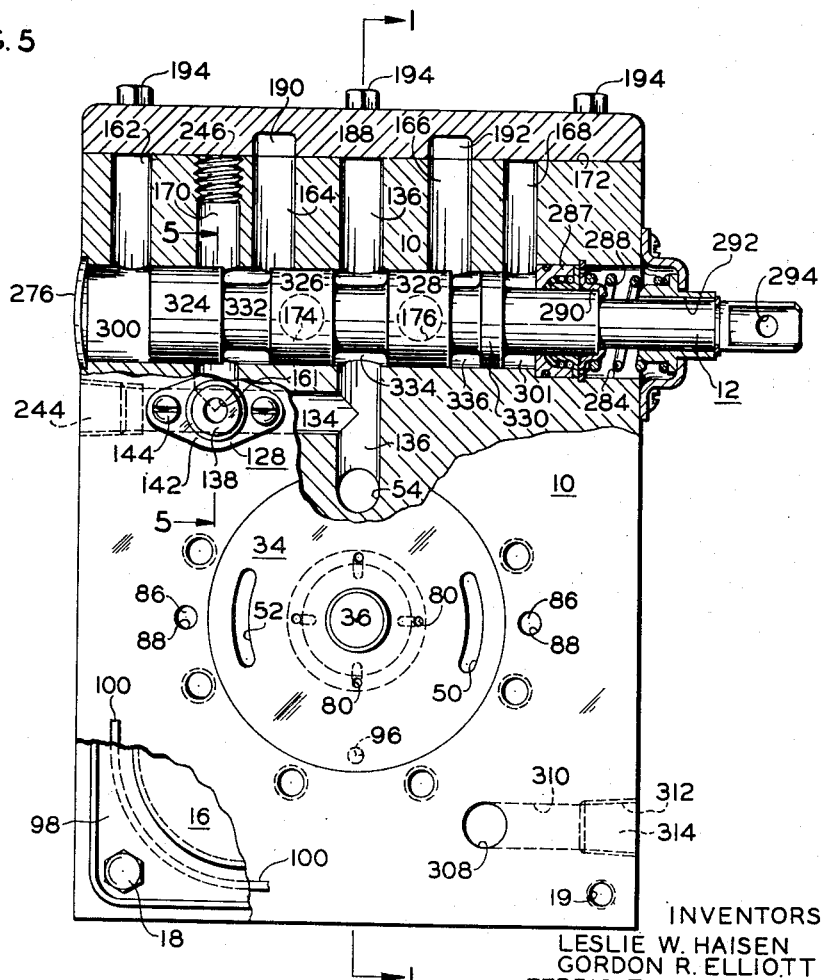
FIG. 4
INVENTORS
LESLIE W. HAISEN
GORDON R. ELLIOTT
FERRIS T. HARRINGTON
JOSEPH A. MARTIN
BY 
ATTORNEY

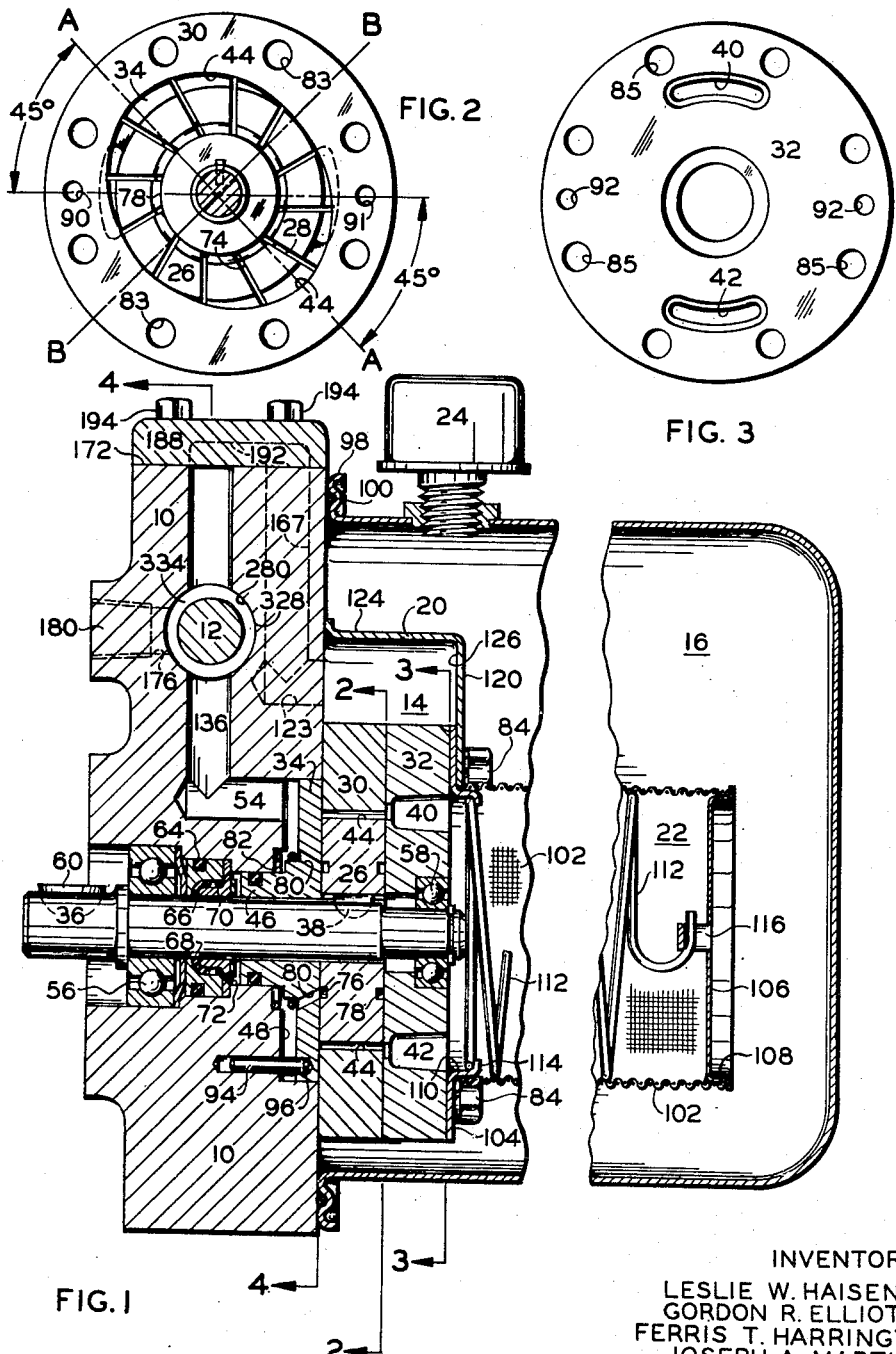

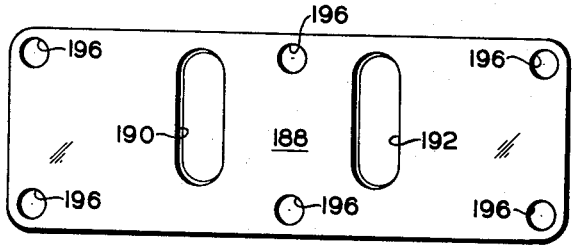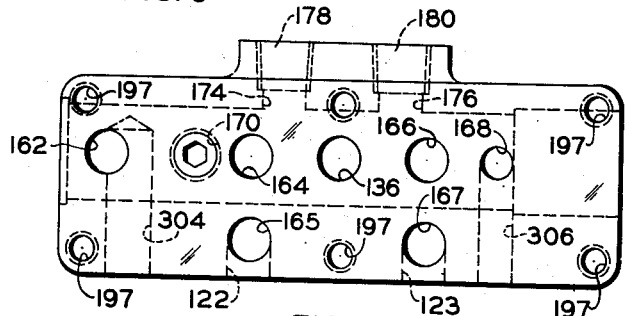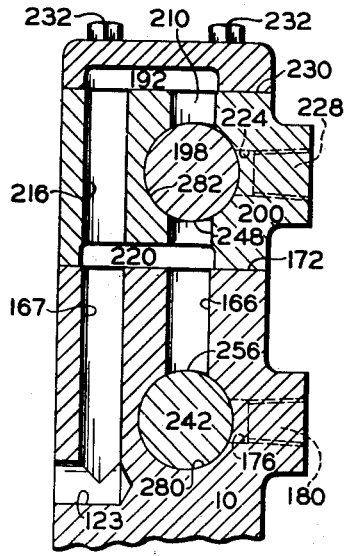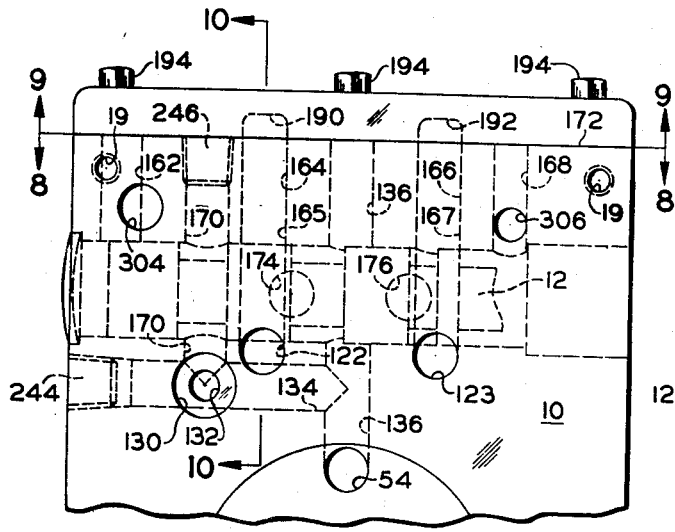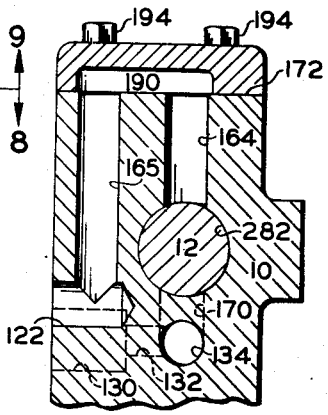

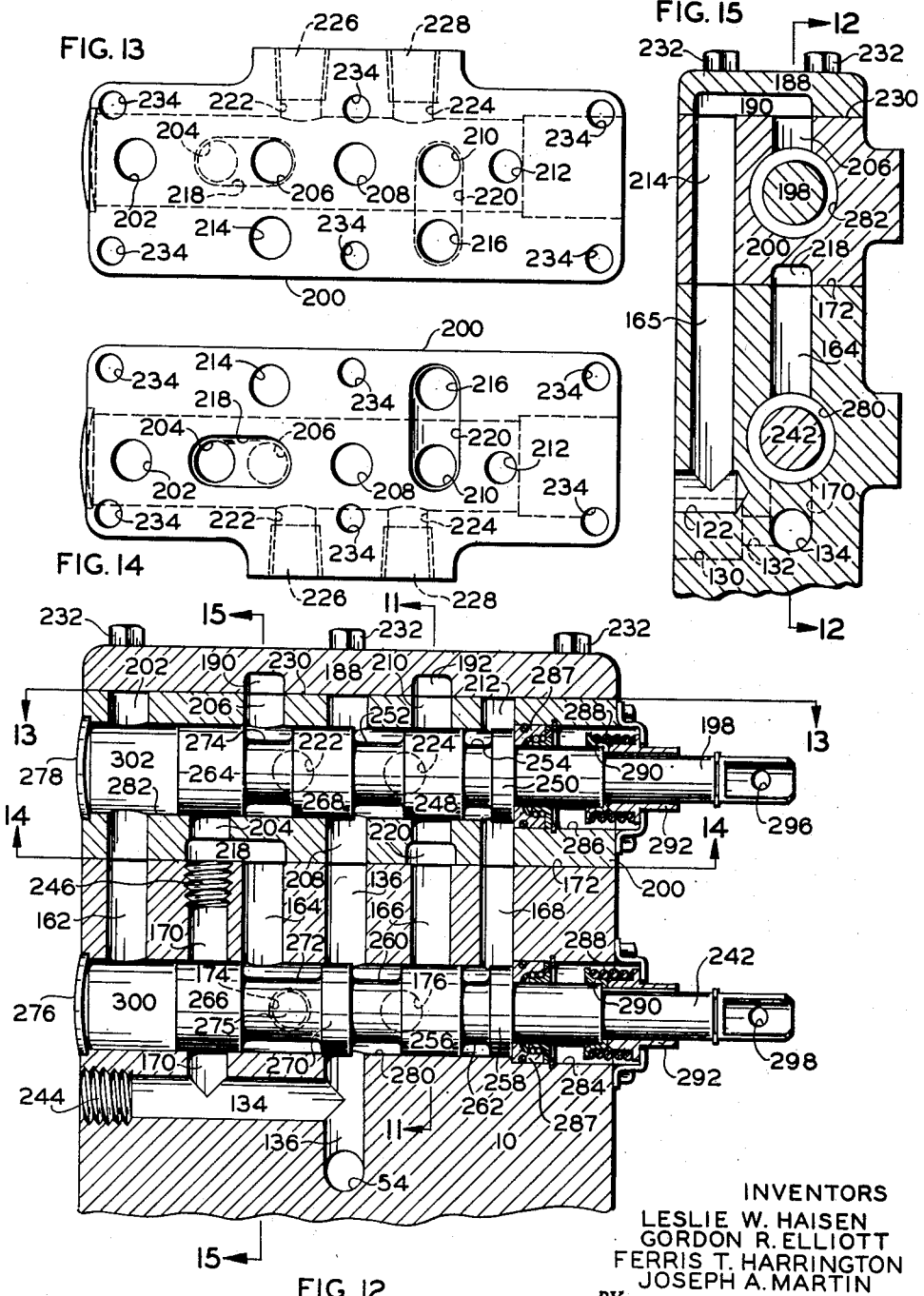

United States Patent Office 2,693,824
Patented Nov. 9, 1954

2,693,824

POWER TRANSMISSION VALVE

Ferris T. Harrington, Detroit, and Joseph A. Martin, West Bloomfield Township, Oakland County, Mich., Gordon R. Elliott, Omaha, Nebr., and Leslie W. Haisen, Royal Oak, Mich., assignors to Vickers Incorporated, Detroit, Mich., a corporation of Michigan Original application January 4, 1947, Serial No. 720,274, now Patent No. 2,544,990, dated March 13, 1951. Divided and this application June 15, 1950, Serial No. 168,312

1 Claim. (Cl. 137—622)

The present application is a division of applicants' copending application Serial No. 720,274 filed January 4, 1947, now Patent 2,544,990, March 13, 1951.

This invention relates to power transmissions in general, but more particularly to auxiliary hydraulic power transmissions such as those employed on farm tractors and road machinery.

An object of this invention is to provide a hydraulic power device comprising pump, tank, and valve elements for operating a motor.

Such a power device must be designed in such a manner as to facilitate mounting the device on the tractor. Since the space available for additional equipment is limited, the various elements comprising the device must be small and compact and preferably assembled into a single structure or power pack.

An object of the present invention is to provide the required pump, tank, and valve elements in a packaged form capable of mounting as a single unit and occupying a minimum amount of space.

As suggested above, the tractor power pack must be capable of supplying hydraulic pressure fluid for operating any type of motor within the pump's capacity. Consequently, the average tractor owner, if he has not already done so, contemplates equipping his tractor with various types of power accessories. In many cases, one accessory may require two or more hydraulic motors for complete operation. In fact, it is sometimes desirable to operate two of the load devices or motors simultaneously or at least provide for consecutive operation. To accomplish this, it was necessary to provide multiple valves for the power pack.

Another object of the invention is to provide a multiple valve bank adapted to be assembled as an integral part of the power pack assembly and capable of independently controlling each motor or power accessory.

Further, it is an object to so arrange the unit that the main assembly may be built up with various numbers of control valves, any of which may be removed or added interchangeably using the same basic parts.

In order to consolidate the elements into a unitary assembly to conserve space and material and produce an economical unit, the various elements have been designed to serve more than one purpose. For example, the directional valve housing also serves as an integral part of the pump. Passages are provided in that body in place of external conduits such as copper tubes connecting the pump and valve elements.

Therefore, another object of the present invention is to provide an assembly of elements into a unitary power pack wherein the individual elements frequently serve combination functions in operation.

For economical reasons, the passages in the valve block or body are all of a straight form and normally perpendicular to one of the outer surfaces of the block. Such a design eliminates the necessity of cored passages and makes possible a saving by drilling the passages on multiple spindle drills.

Therefore, another object is to design a valve block and housing in which all the passages are straight and perpendicular to one of the surfaces of the block.

Further objects and advantages of the present invention will be apparent from the following description, reference being had to the accompanying drawings wherein a preferred form of the present invention is clearly shown.

In the drawings:

Figure 1 is a sectional view of a hydraulic power pack embodying a preferred form of the present invention and taken along the line 1—1 of Figure 4.

Figure 2 is a section on line 2—2 of Figure 1.

Figure 3 is a view of the fixed pressure head on line 3—3 of Figure 1.

Figure 4 is a section on line 4—4 of Figure 1.

Figure 5 is a section on line 5—5 of Figure 4.

Figure 6 is an end elevation of the baffle.

Figure 7 is a partial view of the valve block showing the location of the passages therein.

Figure 8 is a section on line 8—8 of Figure 7.

Figure 9 is a section on line 9—9 of Figure 7.

Figure 10 is a section on line 10—10 of Figure 7.

Figure 11 is a section on line 11—11 of Figure 12.

Figure 12 is a sectional view of a multiple valve block along the center line of the valves corresponding to line 12—12 of Figure 15.

Figure 13 is a section on line 13—13 of Figure 12.

Figure 14 is a section on line 14—14 of Figure 12.

Figure 15 is a section on line 15—15 of Figure 12.

Figure 16:
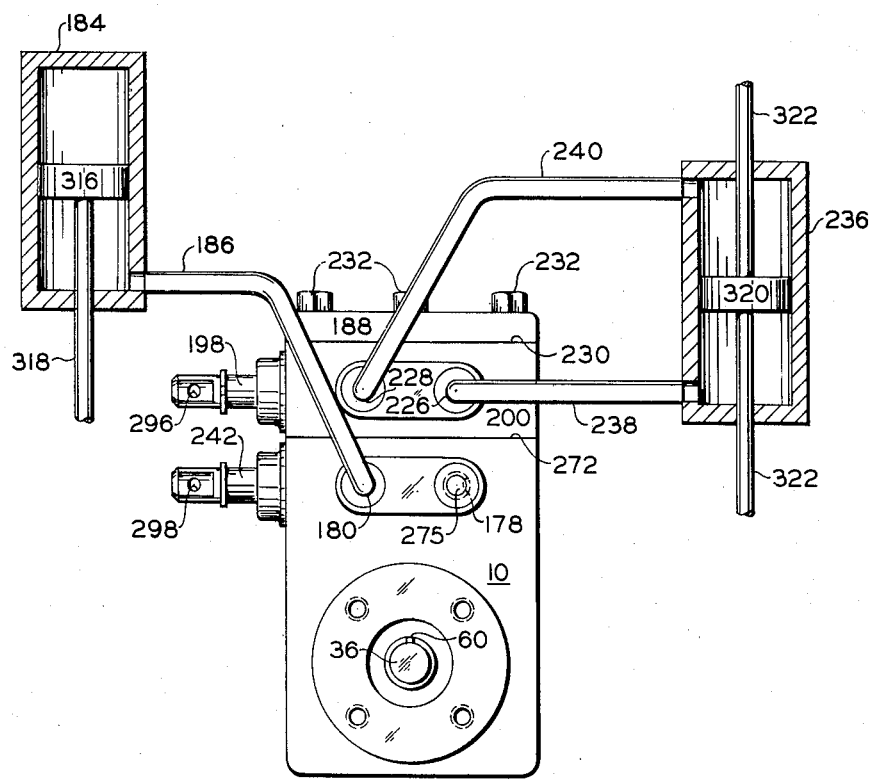
Figure 16 illustrates a hydraulic transmission employing a preferred form of the invention and provided with multiple valves and motors.

The various elements making up the power pack of Figures 1 and 4 include the body 10 housing the valve 12 and pump 14. An open end tank element 16 is fastened to the body 10 by bolts 18 in tapped holes 19 and encloses the baffle 20 and filter 22. A combination air vent and filler cap 24 is mounted on top of the tank 16.

The pump 14 comprises a rotor 26 provided with radial vanes 28 mounted in the cam ring 30 between a fixed pressure head 32 and a floating pressure head 34. The rotor 26 is mounted on the drive shaft 36 and fastened by key 38. The fixed pressure head 32 is provided with arcuate axial inlet ports 40 and 42 connecting the pump working chamber 44 directly to tank. The floating pressure head 34 is in the form of a radial flange attached to a hub portion 46. The head 34 is adapted to move axially along shaft 36 in the pressure chamber 48 and be maintained in sealing contact with the ring 30 and rotor 26 by means of operating pressure in chamber 48. Outlet ports 50 and 52 in floating head 34 extend directly through the head from the pump working chambers 44 to the pressure chamber 48. Operating pressure fluid is discharged from the working chambers 44 by means of the outlet ports 50 and 52 to the pressure chamber 48 and then to the discharge passage 54 and so on to the directional valve 12.

The pump drive shaft 36 is supported by bearings 56 and 58 and is provided with a key 60 at its outboard end for coupling to a prime mover, which may be the tractor engine, in any convenient manner. An oil seal 64 comprising a cylindrical sealing element 66 located in the guide 68 is extruded radially into sealing contact with shaft 36 as a result of the force of the resilient element 70 in combination with oil pressure communicated through the passage 72 against the end of the seal 66 into sealing contact with shaft 36.

The rotor 26 is provided with radial vane slots 74, the base or inner ends of which are adapted to carry operating pressure communicated from annular grooves 76 and 78 in the side of the rotor 26 for forcing the vanes 28 outward into contact with the cam ring 30 to form the working chambers 44 between the pressure heads 32 and 34. The annular groove 76 communicates with pressure chamber 48 by means of four diagonal passages 80 through floating pressure head 34.

During normal operation, the floating head 34 is maintained in sealing contact with the ring 30 and rotor 26 by means of operating pressure. During standby or starting conditions, a resilient element such as spring 82 is employed to provide a sealing force in the absence of operating pressure. The fixed pressure head 32 and ring 30 are fastened together and to the body 10 by means of eight bolts 84 through bolt holes 83 and 85 respectively.

Two dowel pins 86 located in dowel holes 88 in body 10 are adapted to enter and align dowel holes 90 and 91 or ring 30 and dowel holes 92 in fixed pressure head 32. Said dowel holes 90 and 91 in the cam ring 30 are diametrically opposed and angularly displaced from the major diameter "AA" of the cam ellipse by an angle of 45° (see Figure 2).

The function of the dowels is to provide accurate means for changing the relative position of the pump elements when the direction of rotation is reversed. When the direction of rotation of the drive shaft 36 is reversed, the cam ring 30 with vanes 28 and rotor 26 may be rotated end for end. In the new position, the dowel hole 90 occupies the former position of the dowel hole 91 and vice versa. In that case, the major axis "AA" of the ellipse would have been displaced through an angle of 90° to occupy the position "BB" as shown in Figure 2 and the pump elements would be in position for reversed rotation.

A dowel pin 94 in body 10 is adapted to enter dowel hole 96 in the floating pressure head 34. Dowel 94 maintains the outlet ports 40 and 42 of the head 34 in correct position relative to the discharge point of the rotor working chamber 44.

An open end tank element 16 is preferably made of sheet metal by a drawing process. A double reverse curved bead or flange 98 has been provided for holding a sealing element 100. The open end tank element 16 is adapted to be closed by the body 10 acting as a cover thereby positioning the pump 14 and filter 22 within the tank enclosure. An air vent 24 is located in the wall of the tank 16 for maintaining atmospheric pressure in the tank.

The filter 22 comprises a tubular screen 102 mounted between two end pieces 104 and 106, one of which functions as a mounting flange 104 and the other as an end or assembly cap 106. The end cap 106 is provided with a boss 108 adapted to fit the inside diameter of the tubular screen element 102 as a supporting frame member. The mounting flange 104 is provided with a similar boss 110 adapted to fit the opposite end of the tubular screen.

A coil spring 112 has an outside coil diameter approximately equal to the bore of the tubular screen 102. The spring 112 is adapted to be held at one end by the lips 114 on the mounting flange 104 and at the other end by an eye 116 formed in the end cap 106. Since the spring is under slight tension, it holds the flange 104 and cap 106 in position on the end of the screen tube and places the tubular screen element 102 under slight compression. To prevent the tubular screen 102 from collapsing the coil spring 112 bears against the innerwall of the screen and acts as a frame support to help maintain the screen's tubular shape.

The filter mounting flange 104 is provided with bolt holes for accommodating the bolts 84 and thus fastening the filter to the pressure head 32. Suction fluid from the tank 16 is drawn through the screen 102 and passes axially through the tubular element and the open center mounting flange 104 into the pump inlet ports 40 and 42 in the head 32.

The baffle 20 is arcuate in shape and has an angular or L-shaped cross-section. The two bolt holes 118 are adapted to accommodate bolts 84 whereby said bolts rigidly fasten both the filter 22 and the baffle 20 to the body 10. The vertical arm 120 of the L-shaped baffle plate is positioned at right angles to the axis of the tank or return passages 122 and 123, thus interrupting the direction of flow of the return fluid. The other leg 124 of the L-shaped baffle is concentric with the fixed pressure head 32 and ring 30 and its inner end abuts against the face of the body 10, thus forming a passage 126 at right angles to the tank passages 122 and 123. Therefore, return fluid cannot follow the shortest path of flow from passage 122 and 123 to inlet ports 40 and 42, but is interrupted in its direction of flow in order to remove any air suspended in the fluid and thereby prevent cavitation.

A relief valve 128 is located in the body counterbore 130 of passage 132 which communicates with pressure chamber 48 by means of passages 134, 136, and 54. The relief valve structure comprises a drawn metal cylindrical body 138 provided with an inwardly projecting flange 140 at its outer end. An external flange 142 is provided for fastening the valve 128 to the body 10 by means of machine screws 144. The relief valve is a packaged article and includes one or more spring tension adjustment spacer washers 146 at the flanged end of the body. A bushing 148 at the open end is adapted to fit snugly in counterbore 130. The bushing 148 functions as a valve seat to support the ball valve 150 which is maintained on its seat by means of spring 152 and ball guide 154. An annular groove 156 is provided in the periphery of the bushing 148 to hold a torus shaped seal 158.

Adjustment of the spring 152 to obtain the correct compression is accomplished by varying the number of spacer washers 146 in the relief of valve body 138. Therefore, the number of spacer washers 146 used will increase or decrease in proportion to the required pressure setting of the relief valve 128. When the operating pressure reaches the relief pressure setting, the ball valve 150 will be lifted from its seat and pressure fluid will be discharged through the internal bore 160 and orifice 161 in the relief body 138 directly into the tank 16.

For simplicity of design and economical reasons, the passages in body 10 are shown to be straight bored and approximately perpendicular to the external surface in which they terminate. By providing parallel passages, they may be constructed by multiple spindle drills and the expense of a coring operation is thus eliminated. As illustrated in Figure 4, tank passages 162, 164, 165, 166, 167, and 168 and pressure passages 170 and 136 are parallel and perpendicular to mounting surface 172.

Motor passages 174 and 176 in the body 10 extend to external connections 178 and 180, respectively, from the valve bore 280. Figures 12 and 16 illustrate a single acting valve controlling a single acting motor 184 by means of conduit 186.

A cover plate 188 is adapted to fit mounting surface 172 of body 10 and be retained thereon by bolts through bolt holes. Cover plate 188 is provided with slots 190 and 192 for cross-connecting tank passages 164 and 166 to passages 165 and 167, respectively. Six bolts 194 are provided for holding cover plate 188 in place on body 10 and are adapted to pass through bolt holes 196 and bottom in tapped holes 197 in body 10.

Figures 1 to 10 inclusive illustrate the power pack employing a double acting directional valve 12 located in the body 10. The mounting surface 172 is designed to receive cover plate 188 or a second valve body. Figures 11 to 16 inclusive illustrate the power pack employing a second directional valve 198 mounted in the auxiliary valve body 200.

Passages 202, 204, 206, 208, 210, and 212 in valve body 200 are in line with passages 162, 170, 164, 136, 166, and 168, respectively, of body 10, and perform similar functions in the second valve body 200. Tank passages 214 and 216 in valve body 200 coincide with passages 165 and 167 in the body 10.

Slot 218 in the base of valve body 200 forms an intercommunication between passage 164 in body 10 and passage 204 in valve body 200. Slot 220 in body 200 forms a cross-connection between tank passages 166 and 167 in body 10 and 210 and 216 in valve body 200. Two cylinder passages 222 and 224 are provided in the second valve body 200 and communicate with external connections 226 and 228, respectively, in the valve body 200.

The top surface 230 of valve body 200 is also a mounting surface adapted to receive the standard cover plate 188 or a third valve body (not shown). In Figures 11 to 16, the same cover plate 188 is mounted on surface 230 as shown in the single valve power pack (Figures 1 to 10). However, the hold down bolts 232 must be longer than the bolts 194 in order that they will pass through bolt holes 234 in valve body 200 to bottom in the tapped holes 197 of the main body 10.

As illustrated in Figures 12 and 16, the second directional valve 198 is a double-acting valve adapted to control the double-acting piston motor 236 which is connected by conduits 238 and 240 to external connections 226 and 228, respectively. The primary or lower directional valve 242 is a single acting valve in which case the external connection 178 is plugged. The surface entrance to other drilled inter-communicating passages such as 134 and 170 are blocked by plugs 244 and 246, respectively.

The directional valve 12 (Figure 4) is similar in form to the double-acting valve 198 in Figure 12. The single-acting valve 242 (Figure 12) is of slightly different construction from the double-acting valve 198 as is evident from Figure 12. The lands 248 and 250 and the annular grooves 252 and 254 of valve 198 are similar to the lands 256 and 258 and the annular grooves 260 and 262 of valve 242. At the left end of the valves, lands 264 and 266 of valves 198 and 242, respectively, are similar. However, land 268 of valve 198 is wider than land 270 of valve 242 and annular groove 272 of valve 242 is wider than groove 274 of valve 198. External connection 178 of passage 174 is blocked by a plug 275 (Figure 16).

Caps 276 and 278 are provided for sealing the opening to valve recesses 280 and 282, respectively. In the counterbores 284 and 286 of valve recesses 280 and 282, respectively, oil seals 287 similar in design to seal 64 are employed on the valve stem. A centering spring 288 is located between two stops 290 and 292, respectively, for maintaining the valve in its central unloaded position as illustrated in Figure 4. At the end of each valve stem a detent hole 294, 296, or 298 is provided for coupling to a control or operating device (not shown).

The end chambers 300 and 302 in recesses 280 and 282, respectively, are interconnected by tank passages 162 and 202, and communicate with the tank 16 through passage 304 (Figure 7). Similarly, the enclosures 301 at the opposite ends of the valves are interconnected by passages 168 and 212 to passage 306 which runs directly to tank 16.

Means for draining tank 16 is provided in the body 10. It consists of a passage 308 open to tank and connected by passage 310 to the external threaded connection 312 provided with a pipe plug 314.

The single-acting motor 184 is provided with a piston 316 adapted to lift a gravity load (not shown) by means of rod 318. The gravity load is capable of returning the piston to its lower position when conduit 186 is connected to tank. The double-acting motor 236 is provided with a piston 320 and through rod 322 which may be connected to a load requiring power to operate it in both directions.

Double-acting directional valve 12 of Figure 4 is provided with lands 324, 326, 328, and 330 and with annular grooves 332, 334, and 336 similar to the double-acting valve 198, the valve occupying the top position in Figure 12.

In operation, hydraulic fluid, preferably oil because of its lubricating characteristics, is supplied to the tank 16 through the combination filler-breather cap 24. After the transmission has been operated to be assured that all the units are filled, the fluid level in the tank 16 should be raised to a point above the upper inlet port 40.

As the shaft 36 and the pump rotor 26 are rotated, hydraulic fluid is drawn through the screen 102 and the inlet ports 40 and 42 into the expanding work chambers 44. The fluid is carried through 90° of rotation of the rotor 26 and is then discharged by the contracting work chamber 44 into the outlet ports 50 and 52 in the floating head 34 which lead to the pressure chamber 48.

In Figures 1 and 4, the power pack is illustrated employing only one directional valve 12. Multiple valve operation will be described in relation to Figures 12 and 16.

Directional valve 12 is a double-acting valve adapted to control a double-acting work cylinder or motor and indicated by numeral 236 in Figure 16. In the valve's neutral position (as shown in Figure 4), the pump 14 is unloaded to tank 16 via passages 54, 136, 134, 170, groove 332, passage 164, slot 190, passages 165 and 122 to tank.

When directional valve 12 is shifted to the right (Figure 4) land 324 blocks unloading passage 170 and causes a pressure build-up in pressure passage 136. The shifting of valve 12 to the right connects passages 136 and 176 by means of annular groove 334 and thus directs operating pressure fluid to one end of the double-acting motor. At the same time, annular groove 332 connects tank passage 164 to cylinder passage 174, thus permitting the discharge of exhaust fluid from the other end of the motor to tank.

When the motor operation is complete, merely releasing the operating handle (not shown) of valve 12 will permit the valve to return automatically to its neutral or unloading position under the force of centering spring 288.

By shifting directional valve 12 to the left, the unloading passage 164, normally in communication with passage 170 by means of annular groove 332 in its neutral position, is blocked by land 326. In the same operation, pressure passage 136 is connected to cylinder passage 174 by means of groove 334, and cylinder passage 176 is exhausted by means of annular grooves 336, passage 166, slot 192, passages 167 and 123 to tank 16.

As pointed out above, chamber 48 is under pressure when the pump is operated since it forms a part of the chain of pump outlet passages. The floating pressure head 34 is urged against the ring 30 and the rotor 26 with a force varying in proportion to the operating pressure. Therefore, the bearing seal between the floating head 34, and the ring 30 and rotor 26 will be increased or decreased according to the pressure demand.

Any oil leakage in the valve recess 280 beyond the land 324 would normally be pocketed in chamber 300 and interfere with valve operation by causing a dashpot action. However, drain passages 162 and 304 connect chamber 300 directly to tank. In the same manner, the right end chamber 301 to the right of land 330 is drained by passages 168 and 306, to tank.

With the valve 12 in either operating position whereby pressure is blocked in the unloading passage, pressure fluid will continue to flow to the motor until the load piston has reached its limit of travel. The system will thereafter be relieved of excess pressure by means of relief valve 128. The operating pressure passage 136 is connected by passages 134 and 132 to ball valve 150. When the pressure force against the valve 150 exceeds the tension in spring 152, the ball will be lifted and excess pressure fluid relieved through bore 160 and orifice 161 of the valve body 138 to tank.

Return fluid, either from the discharge side of the motor or the unloading passage enters the tank 16 through passages 122 or 123. During operation, discharge fluid may be filled with air bubbles but the baffle 20 interrupts the direction of flow and allows the air to separate from the liquid. As the fluid leaves passages 122 and 123, it must flow or divide to the right and left through passage 126 formed by the baffle and enter the tank 16 in the direction away from the filter 22 and follow an indirect path to the screen 102.

The large cross-section of the baffle passage 126 furthermore reduces the velocity of the returning oil before it reaches the main body of oil in the tank and thus causes very little churning up of the oil in the tank.

When more than one load device or motor is to be operated, such as is illustrated in Figure 16, multiple directional valves must be employed. Motor 184 has a single acting piston 316 controlled by valve 242 and is raised by means of hydraulic fluid entering the cylinder through conduit 186. The double-acting motor 236 is controlled by valve 198 (Figure 12). In order to convert the power pack unit of Figure 4 into a multiple motor and valve control unit, the cover plate 188 is raised. An individual or auxiliary valve body 200 is then mounted on surface 172 in place of cover 188 which in turn is moved to mounting surface 230 of the auxiliary valve body 200. Obviously any number of additional valve bodies 200 may be added in this fashion, as may be desired.

If it is desired to operate the single acting motor 316, valve 242 (Figure 12) is shifted to the right until land 266 blocks unloading passage 170. Operating pressure fluid will be directed from pressure passage 136 to cylinder passage 176 by means of annular groove 260 of valve 242.

When piston 316 of motor 184 has been raised to its top limit, excess pressure fluid will be relieved to tank 16 by means of relief valve 128. By releasing the operating handle for valve 242, the centering spring 288 will return the valve to its neutral position and unload the pump via passages 134 and 170, annular groove 272, passage 164, slot 218, passage 204, annular groove 274 of valve 198, passage 206, slot 190, and passages 214, 165, and 122 to tank. By shifting valve 242 to its extreme left position, cylinder passage 176 is opened to tank by means of annular groove 262, passage 166, slot 220, and passages 167 and 123 to tank (Figure 11). Passage 174 and its external cylinder connection 178 are blocked by plug 275.

If double-acting valve 198 is shifted in either direction, its operation is similar to the functioning of valve 12 as described above. When both valves are moved to the right, operating pressure fluid will be directed through cylinder passage 176 and 224 to the respective motors. Discharge fluid from the other end of motor 236 will be directed to tank 16 via cylinder passage 222, annular groove 274, passage 206, slot 190, and passages 214, 165, and 122.

To reverse the direction of travel of the motors 184 and 236, valves 242 and 198 must be shifted to the extreme left (Figure 12). When valve 198 is shifted to the left of its neutral position, land 268 blocks unloading passage 206, and cylinder passage 222 is connected to pressure passage 136 by means of annular groove 252. Cylinder passage 224 of valve 198 in its left position is connected to tank 16 via annular groove 254, passage 210, slot 192, passages 216, 167, and 123. Cylinder passage 176 of valve 242 in its left position is connected to tank by annular groove 262, passage 166, slot 220, and passages 167 and 123.

It will thus be seen that the present invention has provided a power pack of simple, compact, and economical design and suitable for operating and controlling one or more fluid motors. This is accomplished by providing a pump, tank, and control valve assembly constructed into a unitary structure and adapted for mounting additional valve units as an integral part of the basic structure.

While the form of embodiment of the invention as herein disclosed constitutes a preferred form, it is to be understood that other forms might be adopted, all coming within the scope of the claim which follows.

What is claimed is as follows:

A hydraulic power device for operating and controlling a load device comprising a valve body employing a longitudinal valve recess having two spaced motor ports intersecting the recess opening to the outside of the body, a straight pressure passage through the valve body traversing the valve recess at a point between and adjacent the motor ports, a return passage parallel to the pressure passage and traversing the valve recess beyond one motor port, and a combination return and unloading passage formed by two passages offset longitudinally and on opposite sides of the valve recess, one of which lies immediately adjacent the other motor port and connected at one end to the return passage and at the other end to the pressure passage, and a shiftable valve member having means to selectively either connect the pressure passage with the one motor port while connecting the other motor port with said one of the offset passages or connect the two offset passages together while blocking the motor ports or connect the pressure passage with the other motor port while connecting the one motor port to the return passage.

References Cited in the file of this patent

UNITED STATES PATENTS

| Number | Name | Date |
|---|---|---|
| 658,915 | Jacobsen | Oct. 2, 1900 |
| 2,051,137 | Gallaeher | Aug. 18, 1936 |
| 2,220,479 | DeBell | Nov. 5, 1940 |
| 2,247,141 | Twyman | June 24, 1941 |
| 2,288,768 | Zimmermann | July 7, 1942 |
| 2,346,801 | Venable | Apr. 18, 1944 |
| 2,392,422 | Stephens | Jan. 8, 1946 |